US008373549B2

(12) United States Patent
Fadell et al.

(10) Patent No.: US 8,373,549 B2
(45) Date of Patent: Feb. 12, 2013

(54) TACTILE FEEDBACK IN AN ELECTRONIC DEVICE

(75) Inventors: Anthony Fadell, Portola Valley, CA (US); Andrew Hodge, Palo Alto, CA (US); Stephen Zadesky, Portola Valley, CA (US); Aram Lindahl, Menlo Park, CA (US); Anthony Guetta, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 679 days.

(21) Appl. No.: 12/139,009

(22) Filed: Jun. 13, 2008

(65) Prior Publication Data

US 2009/0167508 A1    Jul. 2, 2009

Related U.S. Application Data

(60) Provisional application No. 61/009,625, filed on Dec. 31, 2007.

(51) Int. Cl.
*G08B 6/00* (2006.01)
(52) U.S. Cl. .............. 340/407.2; 340/686.1; 340/539.23
(58) Field of Classification Search ............... 340/407.2, 340/497.1, 815.45, 815.48, 540, 562, 551, 340/568.1, 539.23, 539.32, 686.1, 687
See application file for complete search history.

(56) References Cited

U.S. PATENT DOCUMENTS

| | | | |
|---|---|---|---|
| 5,379,057 A | | 1/1995 | Cough et al. |
| 5,510,584 A | * | 4/1996 | Norris ............................ 200/5 A |
| 5,675,362 A | | 10/1997 | Cough et al. |
| 5,717,423 A | * | 2/1998 | Parker ............................ 345/108 |
| 5,953,541 A | * | 9/1999 | King et al. ........................ 710/67 |
| 6,047,071 A | | 4/2000 | Shah |
| 6,323,846 B1 | | 11/2001 | Westerman et al. |
| 6,473,069 B1 | | 10/2002 | Gerpheide |
| 7,019,622 B2 | * | 3/2006 | Orr et al. ...................... 340/407.1 |
| 7,123,948 B2 | | 10/2006 | Nielsen |
| 7,170,428 B2 | | 1/2007 | Himberg et al. |
| 7,212,802 B2 | | 5/2007 | Rodriguez |
| 8,138,896 B2 | | 3/2012 | Fadell et al. |
| 2003/0174121 A1 | | 9/2003 | Poupyrev et al. |
| 2004/0046744 A1 | * | 3/2004 | Rafii et al. ..................... 345/168 |
| 2004/0056876 A1 | * | 3/2004 | Nakajima ...................... 345/702 |
| 2004/0137935 A1 | * | 7/2004 | Zarom ......................... 455/550.1 |
| 2005/0109841 A1 | | 5/2005 | Ryan et al. |
| 2005/0233707 A1 | * | 10/2005 | Chen ............................ 455/90.1 |

(Continued)

FOREIGN PATENT DOCUMENTS

EP    1 310 860 A1    5/2003
EP    1 505 484 A1    2/2005

(Continued)

OTHER PUBLICATIONS

Invitation to Pay Additional Fees enclosing a Partial International Search in International Application No. PCT/US2008/080938 on Feb. 24, 2009.

*Primary Examiner* — Daniel Previl
(74) *Attorney, Agent, or Firm* — Dorsey & Whitney LLP

(57) ABSTRACT

An electronic device for providing tactile feedback is provided. The electronic device may provide tactile feedback using any suitable approach, including for example vibration, heat, electrical, visual, or any other type of feedback. The electronic device may provide tactile feedback in response to detecting any particular status of the electronic device, receiving any particular input, or detecting any suitable communication received by the electronic device. For example, the electronic device may provide tactile feedback in response to receiving a particular user input, or to detecting a user's finger on a particular portion of the electronic device.

28 Claims, 11 Drawing Sheets

U.S. PATENT DOCUMENTS

| | | |
|---|---|---|
| 2006/0026521 A1 | 2/2006 | Hotelling et al. |
| 2006/0026535 A1 | 2/2006 | Hotelling et al. |
| 2006/0136630 A1 | 6/2006 | Eid et al. |
| 2007/0152983 A1 | 7/2007 | McKillop et al. |
| 2007/0236450 A1 | 10/2007 | Colgate et al. |
| 2008/0074084 A1 | 3/2008 | Lee et al. |
| 2008/0143496 A1 | 6/2008 | Linjama |
| 2008/0150899 A1* | 6/2008 | Lin ............................... 345/168 |
| 2008/0158145 A1 | 7/2008 | Westerman et al. |
| 2008/0188268 A1* | 8/2008 | Kim et al. ...................... 455/566 |
| 2009/0116691 A1* | 5/2009 | Scholl ............................ 382/103 |
| 2009/0167704 A1 | 7/2009 | Terlizzi et al. |
| 2009/0170532 A1 | 7/2009 | Lee et al. |

FOREIGN PATENT DOCUMENTS

| | | |
|---|---|---|
| WO | WO-2006/042309 A1 | 4/2006 |

\* cited by examiner

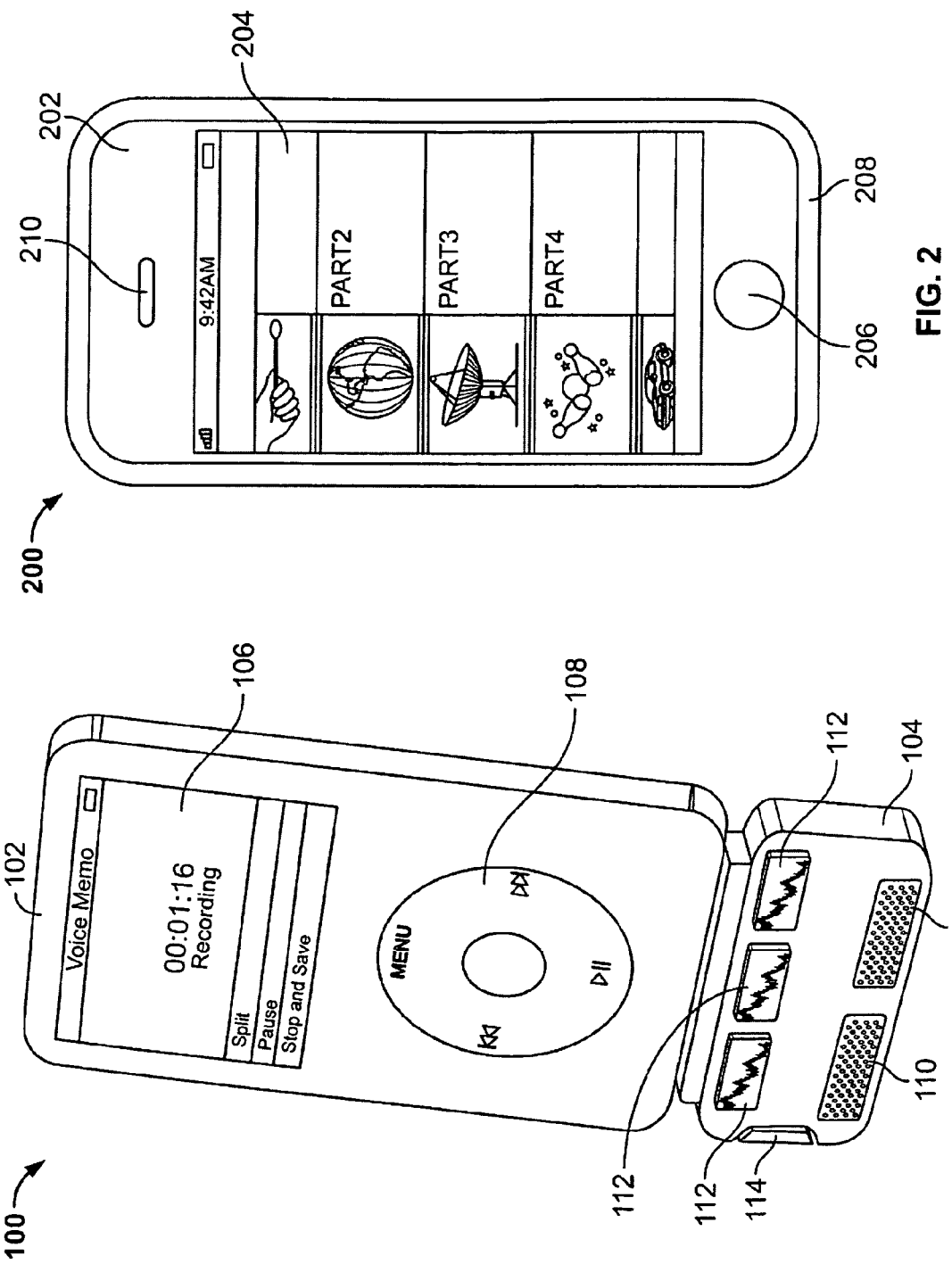

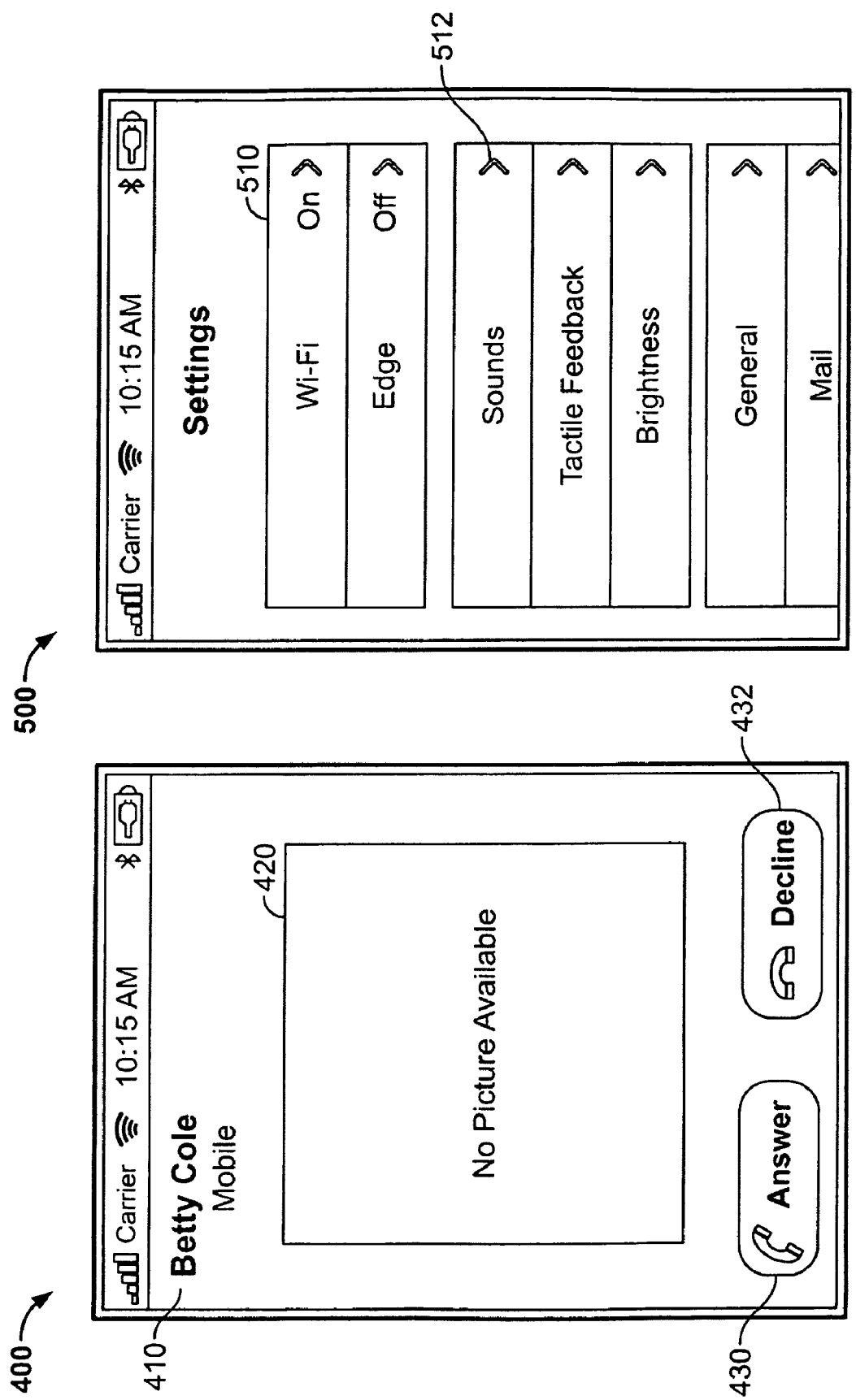

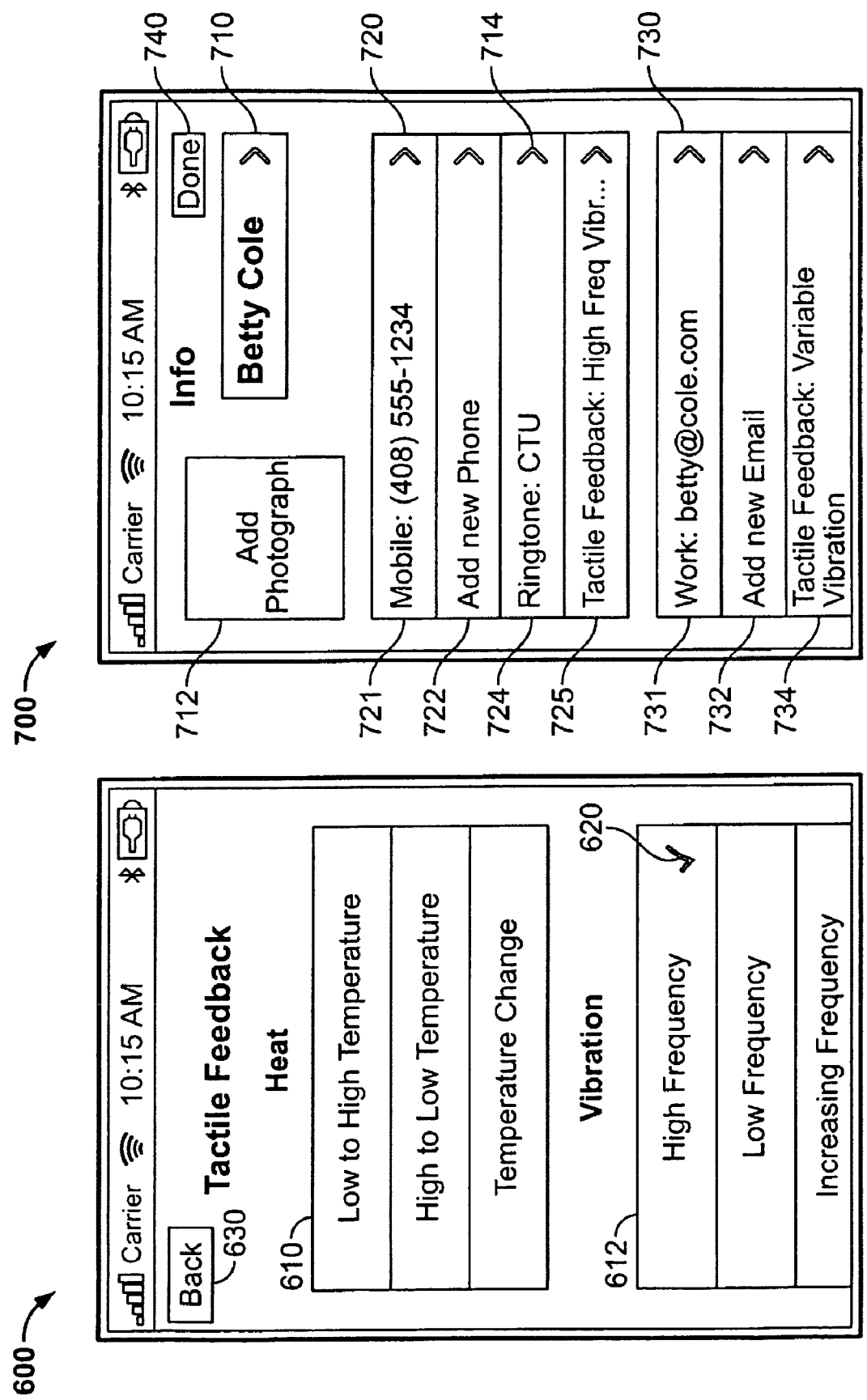

TACTILE FEEDBACK IN AN ELECTRONIC DEVICE

CROSS-REFERENCE TO RELATED APPLICATION

This application claims the benefit of prior filed U.S. Provisional Patent Application No. 61/009,625, filed Dec. 31, 2007, which is incorporated by reference herein in its entirety.

BACKGROUND OF THE INVENTION

This invention is directed to providing tactile feedback to a user of an electronic device.

Portable electronic devices have shrunk while providing ever more functionality. Because the devices are smaller, users can more easily carry them, and use them in a variety of situations where larger, less portable electronic devices could be more difficult to use. An effect of the decrease in size of electronic devices has been a decrease in the size of input mechanisms for providing instructions to the electronic device, and a decrease in the size of displays or screens used to navigate the electronic devices and to access the electronic device functions.

For some users, including for example users with poor vision, or users in dark environments (e.g., at night with little or no electronic device backlight), the reduction in size of the input mechanism and display inconveniences the users and may prevent the users from properly using the electronic device, thus leading to frustration. To remedy these limitations, electronic device manufacturers have spent much effort in creating electronic device interfaces with an emphasis on ease of use and intuitiveness.

Some electronic devices provide tactile feedback to users in limited circumstances. For example, some electronic devices vibrate when a telephone call or text message is received. As another example, some electronic devices may vibrate in response to receiving a user selection of a vibration instruction (e.g., a vibrate button).

SUMMARY OF THE INVENTION

An electronic device for providing tactile feedback to a user in response to detecting a particular state of the device, or in response to detecting a particular user input is provided. Using tactile feedback, the electronic device may supplement one or more menus, selectable options, or other user interface features to facilitate the use of the electronic device.

The electronic device may be operative to provide any suitable tactile feedback. For example, the electronic device may provide vibration feedback. The electronic device may vibrate using any suitable approach. For example, one or more vibrating components integrated in the electronic device may vibrate at particular times. The vibrating components may be operative to cause the entire electronic device to vibrate, or only portions of the electronic device (e.g., the portion of the screen under the user's finger) to vibrate. As another example, the electronic device may provide temperature or heat-based tactile feedback (e.g., change the temperature of one or more portions of the electronic device), electrical tactile feedback (e.g., small, localized or general electrical discharges). In some embodiments, the electronic device may simultaneously provide different types of tactile feedback, visual feedback, audio feedback, olfactory feedback, or any other suitable combination of feedback.

The electronic device may provide tactile feedback at any suitable time. In some embodiments, the electronic device may provide tactile feedback based on communications operations available to the device. For example, the electronic device may provide tactile feedback in response to detecting a particular type of communications network, or receiving a particular communication (e.g., a particular type of communication, or a communication from a particular source). As another example, the electronic device may provide tactile feedback in response to determining the current status of an ongoing communications operation (e.g., the duration of the communications operation, or the amount of data received or sent). As still another example, the electronic device may provide tactile feedback in response to determining the current amount of communications credit remaining in a user's account.

In some embodiments, the electronic device may provide tactile feedback in response to detecting the user's hands on the electronic device. For example, the electronic device may provide tactile feedback in response to detecting a user's finger over a particular displayed option (e.g., a key of a keyboard or keypad, or a particular selectable option of an application). As another example, the electronic device may provide tactile feedback to guide the user in entering text on the electronic device (e.g., provide tactile feedback to identify the position of a displayed line, word, character or cursor). As still another example, the electronic device may provide tactile feedback to assist the user in navigating displayed menu options.

In some embodiments, the electronic device may be operative to provide tactile feedback based on the status of the electronic device. For example, the electronic device may provide tactile feedback in response to determining the amount of memory available, the battery life, the processor or bus speed, or any other resource of the electronic device. As another example, the electronic device may provide tactile feedback based on the location of the user (e.g., provide tactile feedback to guide a user along a path, or to a particular destination). As still another example, the electronic device may provide tactile feedback in response to detecting the environment in which the device is found (e.g., based on a proximity sensor or an accelerometer).

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which:

FIGS. 1 and 2 are simplified diagrams of computer systems in accordance with one embodiment of the invention;

FIG. 4 is a schematic view of an illustrative display for receiving an incoming telephone call in accordance with one embodiment of the invention;

FIG. 5 is a schematic view of illustrative displays for associating a particular tactile feedback with a received communication in accordance with one embodiment of the invention;

FIG. 6 is a schematic view of a display for selecting a particular tactile response in accordance with one embodiment of the invention;

FIG. 7 is a schematic view of a display screen for defining a contact's settings in accordance with one embodiment of the invention;

DETAILED DESCRIPTION

Figure 3:
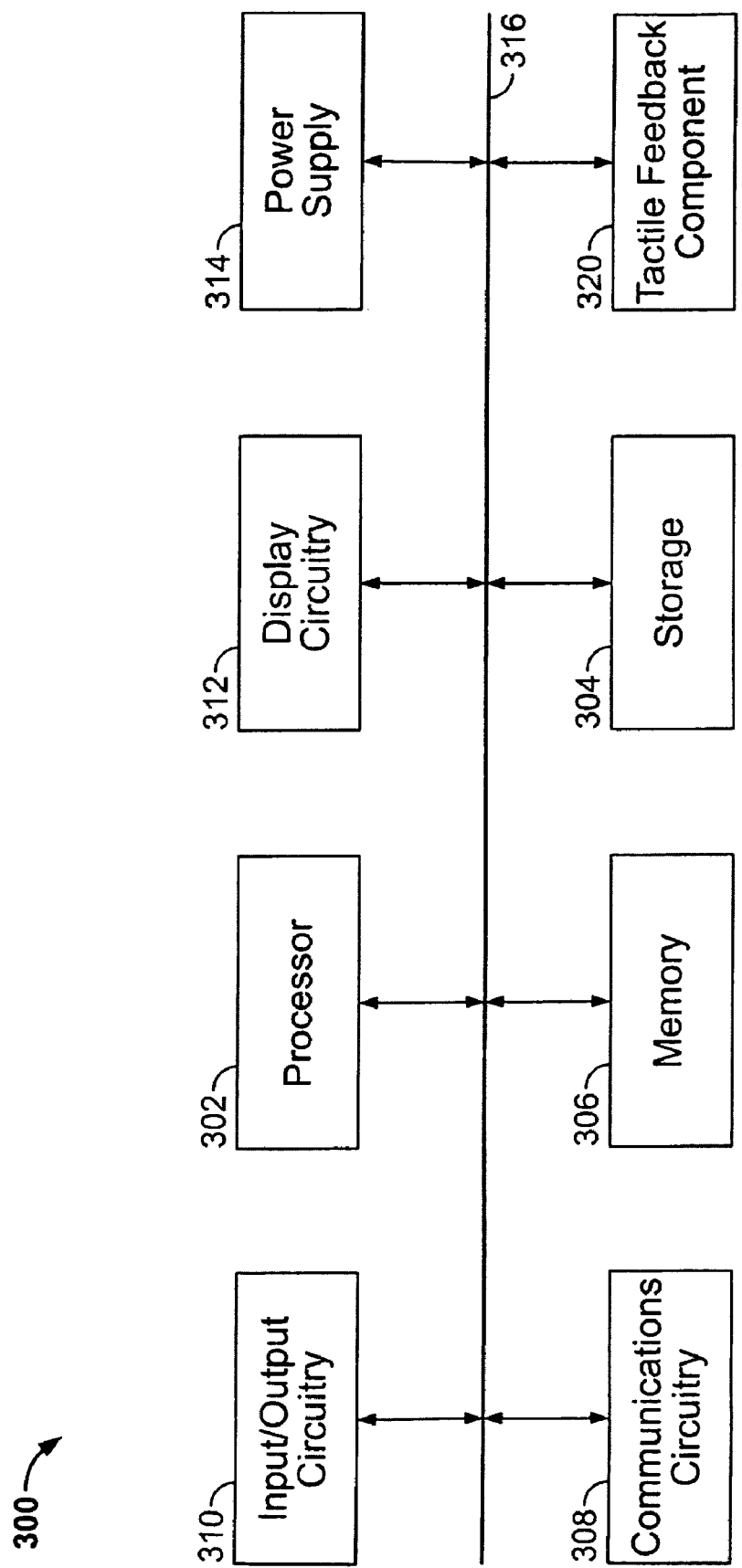
FIG. 3 illustrates a simplified schematic diagram of an illustrative electronic device or devices in accordance with one embodiment of the present invention.

FIG. 1 is a simplified diagram of computer system 100, which can be operated in accordance with the principles of the present invention. In some embodiments, computer system 100 may include electronic device 102 and accessory device 104. Electronic device 102 may include display component 106 and user input component 108.

Display component 106 is illustrated in FIG. 1 as a display screen that is integrated into electronic device 102. In some embodiments, display component 106 may instead be external to electronic device 102. For example, display component 106 may be a computer monitor, television screen, and/or any other graphical user interface, textual user interface, or combination thereof. Using display component 106, electronic device 102 may display the video portion of video content, one or more images, a user interface for controlling electronic device 102, combinations thereof, or any other suitable display.

User input component 108 is illustrated in FIG. 1 as a click wheel. One skilled in the art will appreciate that user input component 108 could be any type of user input device that is integrated into or located external to electronic device 102. For example, user input component 108 could also include a mouse, keyboard, trackball, slider bar, one or more buttons, electronic device pad, dial, or any combination thereof. User input component 108 may also include a multi-touch screen such as that shown in FIG. 2 and described in commonly owned Westerman et al., U.S. Pat. No. 6,323,846, issued Nov. 27, 2001, entitled "Method and Apparatus for Integrating Manual Input," which is incorporated by reference herein in its entirety. User input component 108 may emulate a rotary phone or a multi-button electronic device pad, which may be implemented on a touch screen or the combination of a click wheel or other user input device and a screen. A more detailed discussion of such a rotary phone interface may be found, for example, in commonly owned McKillop et al., U.S. patent application publication No. 2007/0152983, published Jul. 5, 2007, entitled "Touch Pad with Symbols based on Mode," which is incorporated by reference herein in its entirety.

Accessory device 104 can include microphones 110, input buttons 112 and eject button 114. Microphones 110 may be operative to receive audio signals. Circuitry (not shown), which can be included in electronic device 102, accessory device 104, or both can convert the audio signals into one or more audio data files. Buttons 112 can be used to interact with (e.g., edit, save, export, delete, etc.) the audio data files. Eject button 114 can be used to decouple accessory device 104 from electronic device 102.

Accessory device 104 is shown in FIG. 1 as being physically and electrically coupled to electronic device 102 via a connector component (not shown). In other embodiments, accessory device 104 can be wirelessly coupled to electronic device 102. When accessory device 104 is coupled to electronic device 102, either or both devices may have enhanced functionality. This enhanced functionality may automatically occur in response to the devices being coupled together or in response to a user input. For example, accessory device 104 may not have its own power supply or display screen and only function when it is coupled to electronic device 102. Similarly, electronic device 102 may not have its own microphone(s) or only have a lower fidelity microphone, but when electronic device 102 is coupled to accessory device 104, the circuitry in electronic device 102 can make high fidelity recordings. As another example, specialized circuitry or applications (e.g., for recording and converting audio signals) may only be included in accessory device 104 and not in electronic device 102. Accessory device 104 may also have, for example, limited storage capacity and may need to utilize the storage component(s) of electronic device 102 to store audio data files.

FIG. 2 shows computer system 200 which can also be used in accordance with the present invention. Computer system 200 includes electronic device 202, which can include, for example, a portable media player, cellular telephone, personal organizer, hybrid of such devices, or any other electronic device. Electronic device 202 may include user interface component 204. User interface component 204 is shown in FIG. 2 as a multi-touch screen that can function as both an integrated display screen and user input device. Electronic device 202 can also include one or more other user interface components, such as button 206, which can be used to supplement user interface component 204.

Electronic device 202 may include any suitable input and output components. For example, electronic device 202 may include microphone 208 and audio output 210. Microphone 208 may include some or all of the features of microphones 110 discussed above. As such, the audio recording functionality, circuitry and components of accessory device 104 of FIG. 1 can be integrated into electronic device 202. Audio output 210 is shown as being a speaker integrated into electronic device 202, but one skilled in the art would appreciate that audio output 210 may also include an external device (such as headphones) or connector used to facilitate the playing back of audio content and/or the audio portion of video content.

FIG. 3 illustrates a simplified schematic diagram of an illustrative electronic device or devices in accordance with one embodiment of the present invention. Electronic device 300 can be implemented in or as any type of electronic device or devices, such as, for example, electronic devices 102 and 202 discussed above.

Electronic device 300 may include processor 302, storage 304, memory 306, communications circuitry 308, input/output circuitry 310, display circuitry 312, power supply circuitry 314, tactile feedback component 320, or any other suitable component. In some embodiments, electronic device 300 can include more than one of each component or circuitry, but for sake of simplicity, only one of each is shown in FIG. 3. In addition, one skilled in the art would appreciate that the functionality of certain components and circuitry can be combined or omitted and that additional components and circuitry, which are not shown in FIGS. 1-3, can be included in electronic devices 102, 202 and 300, and in accessory device 104.

Processor 302 may include any processing circuitry operative to control the operations and performance of electronic device 300. For example, processor 302 may be used to run operating system applications, firmware applications, media playback applications, media editing applications, and/or any other application. In some embodiments, a processor may drive the display and process inputs received from the user interface.

Storage 304 can be, for example, one or more storage mediums, including a hard-drive, flash memory, permanent memory such as ROM, any other suitable type of storage component, or any combination thereof. Storage 304 may store, for example, media data (e.g., music and video files), application data (e.g., for implementing functions on device 200), firmware, user preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that may enable electronic device 300 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 306 can include cache memory, semi-permanent memory such as RAM, and/or one or more different types of memory used for temporarily storing data. In some embodiments, memory 306 can also be used for storing data used to operate electronic device applications, or any other type of data that may be stored in storage 304. In some embodiments, memory 306 and storage 304 may be combined as a single storage medium.

Communications circuitry 308 can permit device 300 to communicate with one or more servers or other devices using any suitable communications protocol. For example, communications circuitry 308 may support Wi-Fi (e.g., a 802.11 protocol), Ethernet, Bluetooth™ (which is a trademark owned by Bluetooth Sig, Inc.), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Communications circuitry 308 may include any suitable communications circuitry operative to connect to a communications network and to transmit communications (e.g., voice or data) from electronic device 300 to other devices within the communications network (e.g., other electronic devices or servers). Communications circuitry 308 may be operative to interface with the communications network using any suitable communications protocol such as, for example, Wi-Fi (e.g., a 802.11 protocol), Bluetooth (registered trademark), high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol (e.g., TCP/IP, HTTP, BitTorrent, FTP, RTP, RTSP, SSH, or Telnet).

In some embodiments, communications circuitry 308 may be operative to create a communications network using any suitable communications protocol. For example, communications circuitry 308 may create a short-range communications network using a short-range communications protocol to connect to other devices. For example, communications circuitry 308 may be operative to create a local communications network using the Bluetooth® protocol to couple electronic device 300 with a Bluetooth® headset.

Electronic device 300 may include one more instances of communications circuitry 308 for simultaneously performing several communications operations using different communications networks, although only one is shown in FIG. 3 to avoid overcomplicating the drawing. For example, electronic device 300 may include a first instance of communications circuitry 308 for communicating over a cellular network, and a second instance of communications circuitry 308 for communicating over Wi-Fi or using Bluetooth. In some embodiments, the same instance of communications circuitry 308 may be operative to provide for communications over several communications networks.

Input/output circuitry 310 may be operative to convert (and encode/decode, if necessary) analog signals and other signals into digital data. In some embodiments, input/output circuitry can also convert digital data into any other type of signal, and vice-versa. For example, input/output circuitry 310 may receive and convert physical contact inputs (e.g., from a multi-touch screen), physical movements (e.g., from a mouse), analog audio signals (e.g., from a microphone), or any other input. The digital data can be provided to and received from processor 302, storage 304, memory 306, or any other component of electronic device 300. Although input/output circuitry 310 is illustrated in FIG. 3 as a single component of electronic device 300, a plurality of input/output circuitry can be included in electronic device 300.

Electronic device 300 may include any suitable mechanism or component for allowing a user to provide inputs to input/output circuitry 310. For example, electronic device 300 may include any suitable input mechanism, such as for example, a button, keypad, dial, a click wheel, or a touch screen. In some embodiments, electronic device 300 may include a capacitive sensing mechanism, or a multi-touch capacitive sensing mechanism. Some sensing mechanisms are described in commonly owned U.S. Patent Application Publication No. 2006/0026521, published Feb. 2, 2006, entitled "Gestures for Touch Sensitive Input Device," and U.S. Patent Application Publication No. 2006/0026535, published Feb. 2, 2006, entitled "Mode-Based Graphical User Interfaces for Touch Sensitive Input Device," both of which are incorporated herein in their entirety. The capacitive sensing mechanism may use any suitable approach for detecting an input, including for example centroid detection. The implementation of a mechanism using centroid detection is described in commonly owned U.S. Patent Application Publication No. 2008/0158145, published Jul. 3, 2008, entitled "Multi-Touch Input Discrimination," which is incorporated by reference herein in its entirety. The input mechanism may include any of the features of the input mechanisms described above in connection with electronic devices 102 (FIG. 1) and 202 (FIG. 2).

In some embodiments, electronic device 300 can include specialized output circuitry associated with output devices such as, for example, one or more audio outputs. The audio output may include one or more speakers (e.g., mono or stereo speakers) built into electronic device 300, or an audio component that is remotely coupled to electronic device 300 (e.g., a headset, headphones or earbuds that may be coupled to communications device with a wire or wirelessly).

Display circuitry 312 may include any suitable screen or projection system for providing a display visible to the user. For example, display circuitry 312 may include a screen (e.g., an LCD screen) that is incorporated in electronics device 300. As another example, display circuitry 312 may include a movable display or a projecting system for providing a display of content on a surface remote from electronic device 300 (e.g., a video projector). In some embodiments, display circuitry 312 can include a coder/decoder (CODEC) to convert digital media data into analog signals. Display circuitry 312 also can include display driver circuitry, circuitry for driving display drivers, or both. Display circuitry 312 may be operative to display content (e.g., media playback information, application screens for applications implemented on the electronic device, information regarding ongoing communications operations, information regarding incoming communications requests, or device operation screens) under the direction of processor 302.

Power supply 314 can provide power to the components of device 300. In some embodiments, power supply 314 can be coupled to a power grid (e.g., a wall outlet or automobile cigarette lighter). In some embodiments, power supply 314 can include one or more batteries for providing power to a portable electronic device. As another example, power supply 314 can be configured to generate power in a portable electronic device from a natural source (e.g., solar power using solar cells).

Bus 316 may be operative to provide a data transfer path for transferring data to, from, or between control processor 302, storage 304, memory 306, communications circuitry 308, and any other component included in the electronic device.

In some embodiments, electronic device 300 may include tactile feedback component 320. Tactile feedback component 320 may include any suitable component for providing a tactile or haptic feedback to the user of electronic device 300. In some embodiments, electronic device 300 may enable, disable, or modify tactile feedback based on the state or mode of the electronic device, the particular user (e.g., low amplitude vibrations for a frail user, and high amplitude vibrations for a visually impaired user), or any other suitable criteria. The tactile feedback provided may be localized (e.g., specific to the location of a user's finger or hand on electronic device 300) or general (e.g., the entire device provides tactile feedback). In some embodiments, electronic device 300 may include several tactile feedback components 320 distributed throughout the device, wherein one or more of tactile feedback components 320 are operative to provide tactile feedback at a particular time.

Tactile feedback component 320 may use any suitable approach for providing tactile feedback. For example, tactile feedback component 320 may vibrate to provide tactile feedback. Any suitable component operative to vibrate may be used. For example, tactile feedback component 320 may include one or more of an unbalanced rotating mass (e.g., that resonates upon rotation), a linear vibrator, an oscillator, an undulating coil wire, a piezo-electric grid, or any other suitable vibrating component. The vibration provided may be any suitable type of vibration. For example, tactile feedback component 320 may be operative to provide a sine sweep vibration, a random vibration, a synthesized shock, or any other suitable type of vibration. Tactile feedback component 320 may define any suitable parameter or characteristic for a vibration. For example, tactile feedback component 320 may define the one or more frequencies, the change in frequency, the amplitude (or intensity), the change in amplitude, the duration, the delay between vibrations, the period of the vibration (e.g., the duration of a vibration and pause before the vibration repeats) or any other suitable characteristic of the vibration. In some embodiments, tactile feedback component 320 may provide vibrations with different characteristics based on the mode or state of electronic device 300. In some embodiments, tactile feedback component 320 may include some or all of the features of the vibrating tactile feedback component described in commonly assigned U.S. Patent Application Publication No. 2009/0167704, published Jul. 2, 2009, entitled "Touchscreen Display with Localized Tactile Feedback", which is incorporated herein in its entirety. For example, the tactile feedback may include a localized vibration under or adjacent a user's finger, or a general vibration of the electronic device.

As another example, tactile feedback component 320 may change the temperature of electronic device 300 to provide tactile or haptic feedback. Tactile feedback component 320 may include any suitable component operative to change temperatures to provide the tactile feedback. For example, tactile feedback component 320 may include a resistor, a thermistor, a radiator, a cooling system, or any other component for changing the temperature of some or all of the electronic device. Tactile feedback component 320 may be operative to set any suitable characteristic of the change in temperature, including for example the final temperature, the rate of change in temperature, the heat generated or removed, or any other suitable characteristic of the change in temperature. In some embodiments, tactile feedback component 320 may include one or more insulators to prevent the change in temperature from affecting other components of electronic device 300.

As still another example, tactile feedback component 320 may change the electrical charge received by the user holding electronic device 300 to provide tactile or haptic feedback. Tactile feedback component 320 may include any suitable component for providing an electrical charge to the user. For example, tactile feedback component 320 may include a circuit that is closed by the user's hand (e.g., closed inside electronic device 300) to provide tactile feedback. Tactile feedback component 320 may be operative to set any suitable characteristic of the electrical charge received by the user, including for example the intensity, change in intensity, frequency, change in frequency, or any other suitable characteristic of the received electrical charge.

Although the following discussion will describe tactile feedback in terms of vibrations, it will be understood that any other suitable type of tactile feedback may be used, including for example those described above or combinations of those described above (e.g., vibration with electrical feedback). In addition, it will be understood that visual feedback (e.g., changing the illumination or colors of the display of electronic device 300), audio feedback, olfactory feedback, or any other suitable type of feedback may be used instead of or in addition to tactile feedback.

FIGS. 4-7 and 9-14 are depictions of representative interactive user interface displays according to embodiments of the invention. More specifically, a processor (and/or other circuitry) can be configured to present the interactive user interface displays of FIGS. 4-7 and 9-14 on a display screen or other user interface component. It is important to note that the displays shown in FIGS. 4-7 and 9-14 are unique in that they are optimized to provide advanced interactive functionality, despite the limitations of relatively simple user input devices, such as a click wheel or six button remote control or other limited interface. Designing interactive displays that are used in conjunction with these types of simple user input devices is generally a more complicated process than designing displays that are used with other user input devices (such as a mouse, keyboard, cellular telephone keypad, standard remote control that has more than 6 buttons, etc.). Simple user input devices, though easy for users to use, limit how a user can navigate within a display and among multiple displays.

In some embodiment, the electronic device may provide tactile feedback to the user based on communications or data received by the device. For example, the electronic device may provide tactile feedback in response to receiving an email, telephone call, voicemail, text message, media message, chat request, fax, or any other type of data or voice communication. FIG. 4 is a schematic view of an illustrative display for receiving an incoming telephone call in accordance with one embodiment of the invention. The electronic device may provide display 400 to the user in response to receiving a telephone call from another device. Display 400 may include contact information 410, image 420, and options 430 and 432 for responding to the telephone call. The electronic device may display any suitable contact information 410. For example, contact information 410 may include a contact name and type of device from which the communication is received (e.g., if the received call is from a known contact, for example stored in the user's contacts). As another example, contact information 410 may include a number, address, or other information that the electronic device may use to identify the device from which the call was received.

Display 400 may include image 420 associated with the contact from which the communication was received. For example, image 420 may include a photograph of the contact, an image associated with the contact, or any other suitable image. The image may be retrieved from any suitable location, including for example a v-card or other contact information associated with the contact. In some embodiments, the electronic device may retrieve an image tagged for the contact (e.g., an image taken by the electronic device, an image downloaded over the Internet, or an image loaded from a host device). If no image is associated with the particular contact, the electronic device may instead display an icon or text (e.g., indicating that no image is available).

Display 400 may include any suitable selectable options for responding to the incoming telephone call. For example, display 400 may include answer option 430 and decline option 432. In response to receiving a user selection of answer option 430, the electronic device may connect the telephone call and initiate the telephone communication. In response to receiving a user selection of decline option 432, the electronic device may direct the communications request to a messaging system.

In response to receiving the telephone call or other communications request, the electronic device may provide an indication to the user. For example, the electronic device may provide an audio output (e.g., a telephone ring). As another example, the electronic device may change the display of the electronic device (e.g., provide display 400, or change the illumination or color of the display). As still another example, the electronic device may provide tactile feedback. For example, the electronic device may direct a tactile feedback component (e.g., tactile feedback component 320) to provide a tactile response (e.g., to vibrate).

The electronic device may be operative to notify the user of certain events when the user accepts an incoming communications request and performs a communications operation (e.g., accepts the telephone call). In some embodiments, the electronic device may provide tactile feedback at particular intervals of the communications operations. For example, the electronic device may provide tactile feedback to indicate the progress of a file download or upload (e.g., vibrate when complete), or when the user accesses a particular type of data (e.g., accesses or leaves a secure website). As another example, the electronic device may vibrate every 5 minutes to indicate to the user how long the communications operation has lasted. The electronic device may use different tactile feedback to indicate different durations (e.g., one feedback every 5 minutes, another every 15 minutes, and still another every 30 minutes).

In some embodiments, the tactile feedback may become more pronounced as the communications operation lasts to emphasize the duration for the user. This may be useful, for example, when the user has limited time left on his communications plan (e.g., on a cellular telephone plan). The electronic device may be operative to reduce or eliminate the tactile feedback if the communications operation is free (e.g., data communication over WiFi instead of a cellular network, or a telephone call during free nights and weekends).

In some embodiments, the electronic device may provide tactile feedback based on the amount of communications credit (e.g., time) remaining on the user's account. For example, the electronic device may provide tactile feedback when the user has used 2 hours, 3 hours, 4 hours, or has 1 hour remaining, 30 minutes remaining, or 5 minutes remaining. As another example, the electronic device may provide tactile feedback when the user's additional communications credit exceeds the user's allotted amount (e.g., based on a cellular telephone plan).

In some embodiments, the electronic device may provide tactile feedback based on the communications network being used. For example, the electronic device may provide tactile feedback as the device moves to or from a WiFi or cellular network. As another example, the electronic device may provide tactile feedback as the device, while remaining on the cellular network, moves to or from a roaming mode. As still another example, the electronic device may provide tactile feedback based on the source of the communications network used (e.g., private or public WiFi).

In some embodiments, the electronic device may provide different tactile feedback based on any suitable aspect of a received communication. For example, the electronic device may provide different tactile feedback based on the type of communication received. For example, the electronic device may provide a first tactile feedback for received telephone calls, and a second tactile feedback for received emails. In some embodiments, the electronic device may group several types of received communications for a particular tactile feedback based on a particular characteristic of the communications (e.g., data or voice communications). The electronic device may associate different types of tactile feedback with different types of communication using any suitable approach. In some embodiments, the electronic device may automatically assign a particular tactile feedback to a type of communication. As another example, the user may select a particular tactile feedback for a type of communication. FIG. 5 is a schematic view of illustrative displays for associating a particular tactile feedback with a received communication in accordance with one embodiment of the invention.

Display 500 may include settings that the user may set for the electronic device. For example, display 500 may include selectable options 510 associated with different settings that the user may modify. For example, display 500 may include options 510 for WiFi, Edge, or other communications network settings. As another example, display 500 may include options for general, mail and other application settings accessible to the user of the electronic device. As still another example, display 500 may include options for user interaction and feedback settings. Display 500 may indicate that further options for defining the settings associated with an option 510 are available by displaying arrow 512.

In response to receiving a selection of an option 510, the electronic device may display several options for different selectable tactile response. FIG. 6 is a schematic view of a display for selecting a particular tactile response in accordance with one embodiment of the invention. Display 600 may include several options of tactile responses. In some embodiments, the different tactile responses may be grouped based on a particular characteristic (e.g., the type of tactile response). For example, display 600 may include heat tactile feedback options 610 and vibration tactile feedback options 620. In some embodiments, the user may scroll display 600 to view additional options 610 and 620 for types of tactile feedback.

Display 600 may indicate that the user selected a particular tactile feedback option using marker 620. Marker 620 may include any suitable type of marker, including for example a check-mark, an icon, an image, or any other suitable object that can be displayed on an option 610 or 620. In some embodiments, display 600 may indicate that a particular option has been selected by changing the appearance of the selected option (e.g., changing the border, the background color, the text color, the text font or size, or any other attribute of the displayed option).

Once the user has selected a particular tactile feedback option, or after determining that the currently selected tactile feedback option is correct, the user may return to the previous screen displayed (e.g., display 500) by selecting back option 630. In some embodiments, the user may instead or in addition to providing an input using an input mechanism external to display 600 (e.g., press a home button) to exit display 600.

In some embodiments, the electronic device may provide the user with an option for defining a particular tactile feedback. For example, the electronic device may display one or more options for defining particular characteristics of tactile feedback. In some embodiments, the electronic device may include one or more options for defining the frequency or amplitude of a vibration, the change in frequency or amplitude of a vibration, the particular motion detection component providing the vibration (e.g., if the electronic device includes several motion detection components), or any other suitable attribute of a vibration feedback. The electronic device may provide any suitable interface for defining the attributes of the tactile feedback, including one or more fields for entering values (e.g., numerical values), scroll bars with sliders defining a value, listings of selectable values or options, options for toggling particular attributes (e.g., variable frequency), or any other suitable interface or option for defining a particular tactile feedback.

In some embodiments, the electronic device may display a tactile feedback option (e.g., an option 510, FIG. 5) for one or more particular types of communications operations. For example, in response to receiving a user selection of a mail option (e.g., an option 510 of FIG. 5), the electronic device may display an intermediate screen allowing the user to define different settings for a mail application, where one of the settings is a tactile feedback setting. In response to a selection of the tactile feedback option, the electronic device may provide a display such as display 600 (FIG. 6) for receiving a user selection of a particular tactile feedback option for the mail application. In some embodiments, the user may define different tactile feedback settings for different aspects of each communications application (e.g., a different tactile feedback setting for new mail received by different email accounts).

In some embodiments, the electronic device may provide different tactile feedback based on the user from which a communication is received. For example, the electronic device may automatically assign different tactile feedback settings to different users or group of users (e.g., favorite contacts, other contacts, and unknown users are all associated with different tactile feedback). As another example, the user may define a particular tactile feedback setting for particular users or contacts. FIG. 7 is a schematic view of a display screen for defining a contact's settings in accordance with one embodiment of the invention. Display 700 may include contact name 710 and image 712. Display 700 may include options for the user to provide any suitable information for identifying the user and for contacting the user, as well options for defining settings to control electronic device operations when a communication from the user is received. For example, display 700 may include telephone options 720 and email options 730. Display 700 may indicate that the user may set particular options 720 and 730 by displaying an indicator 714 (e.g., an arrow) in each option. Telephone options 720 may include telephone number options 721 and 722, and notification options 724 and 725. In response to receiving a user selection of tactile feedback notification option 725, the electronic device may display a tactile feedback option display (e.g., display 600, FIG. 6) from which the user may select a particular tactile feedback to associate with received communications from the telephone number associated with the contact identified by contact name 710 (e.g., and store in the electronic device).

Mail options 730 may include email address options 731 and 732, and notification option 734. In response to receiving a user selection of tactile feedback notification option 734, the electronic device may similarly display a tactile feedback option display (e.g., display 600, FIG. 6) from which the user may select a particular tactile feedback. Once the user has set the desired options for the contact, the user may select done option 740 to exit display 700.

In some embodiments, the electronic device may provide tactile feedback to the user based on the current status of the device. For example, the electronic device may provide tactile feedback to indicate the state of the battery. The electronic device may provide tactile feedback when the battery reaches a particular level (e.g., 20% or 10%), and subsequently provide different tactile feedback as the battery level decreases or increases. As another example, the electronic device may provide tactile feedback when electronic device resources (e.g., processor power, free memory, or available bus size) reach particular levels. As still another example, the electronic device may provide tactile feedback in response to detecting a particular output from a proximity sensor, motion detection component (e.g., an accelerometer), or other sensor detecting the status or environment in which the electronic device is found. The electronic device may provide tactile feedback in response to any suitable determination of the status of the electronic device (e.g., provide tactile feedback when an environmental sensor detects that the electronic device is being used in the dark, or in response to the accelerometer detecting that the user is fumbling with the device).

Figure 8:
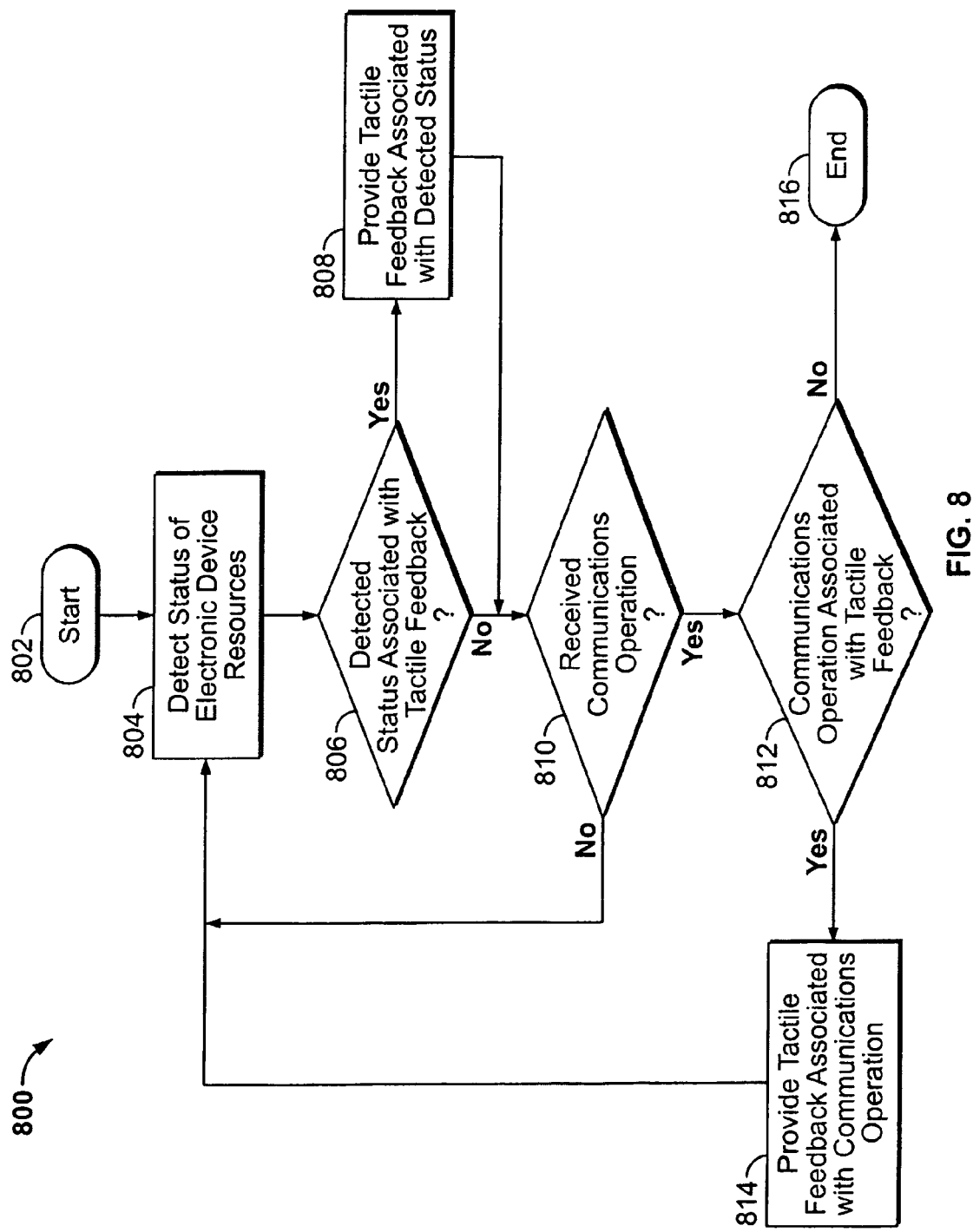
FIG. 8 is a flowchart of an illustrative process for providing tactile feedback in response to detecting a particular state of the electronic device in accordance with one embodiment of the invention.

FIG. 8 is a flowchart of an illustrative process for providing tactile feedback in response to detecting a particular state of the electronic device in accordance with one embodiment of the invention. Process 800 may begin at step 802. At step 804, the electronic device may detect the current status of electronic device resources. For example, the electronic device may determine the current status of the battery, the processor, memory, or any other component of the electronic device. As another example, the electronic device may determine the current communications network used for a communications operation, the duration of a communications operation, the amount of credit remaining for the user to perform the communication operation, or any other suitable status of a communications operation. In some embodiments, process 800 may instead or in addition review the status of an ongoing communications operation at step 812, described below.

At step 806, the electronic device may determine whether a detected status is associated with tactile feedback. For example, the electronic device may compare the detected status of each electronic device resource or component with a known level (e.g., a floor or ceiling amount for the battery level), and determine whether the detected status matches, exceeds, or fails to reach the known level. If the electronic device determines that the detected status is not associated with tactile feedback, process 800 may move to step 810.

If, at step 806, the electronic device instead determines that the detected status is associated with tactile feedback, process 800 may move to step 808. At step 808, the electronic device may provide tactile feedback associated with the detected status. For example, the electronic device may identify the particular tactile feedback associated with the detected status of electronic device resources or components (e.g., from a database of status/tactile feedback associations) and provide the identified tactile feedback. Process 800 may then move to step 810.

At step 810, the electronic device may determine whether a communications operation is received. For example, the electronic device may determine whether a request to perform a communications operation was received (e.g., whether a telephone call was received). As another example, the electronic device may determine whether a communications request is ongoing (e.g., whether the user is conducting a chat with a contact). If the electronic device determines that no communications operation is received, process 800 may return to step 804 and continue to detect the status of the electronic device resources.

If, at step 810, the electronic device instead determines that a communications operation is received, process 800 may move to step 812. At step 812, the electronic device may determine whether the received communications operation is associated with tactile feedback. For example, the electronic device may determine whether the type of communications operation received is associated with tactile feedback. As another example, the electronic device may determine whether the contact from whom the communications operation was received is associated with tactile feedback. As still another example, the electronic device may determine whether the current status of the communications operation (e.g., the duration of the communications operation) is associated with tactile feedback.

If the electronic device determines that the communications operation is associated with tactile feedback, process 800 may move to step 814. At step 814, the electronic device may provide tactile feedback associated with the received communications operation. For example, the electronic device may identify the particular tactile feedback associated with the contact from whom a communications operation is received (e.g., from the contact's profile information) and provide the identified tactile feedback. Process 800 may then move back to step 804 and continue to detect the status of the electronic device resources. If, at step 812, the electronic device instead determines that the communications operation is not associated with tactile feedback, process 800 may move to step 816 and end.

In some embodiments, the electronic device may provide tactile feedback to guide the user in providing inputs to the electronic device. The user may provide inputs using any suitable approach. For example, the user may provide inputs by touching a touch screen or touch pad of the electronic device. As another example, the user may control the position of one or more cursors or highlight regions on the display of the electronic device. As still another example, the electronic device may provide an input using an input mechanism coupled to the electronic device (e.g., a keyboard and a mouse). Although the following (and previous) discussion sometimes describes the inputs as being provided by a user touching a display (e.g., a capacitive touch screen), it will be understood that any other suitable approach may be used to provide inputs to the electronic device.

Figure 9A:
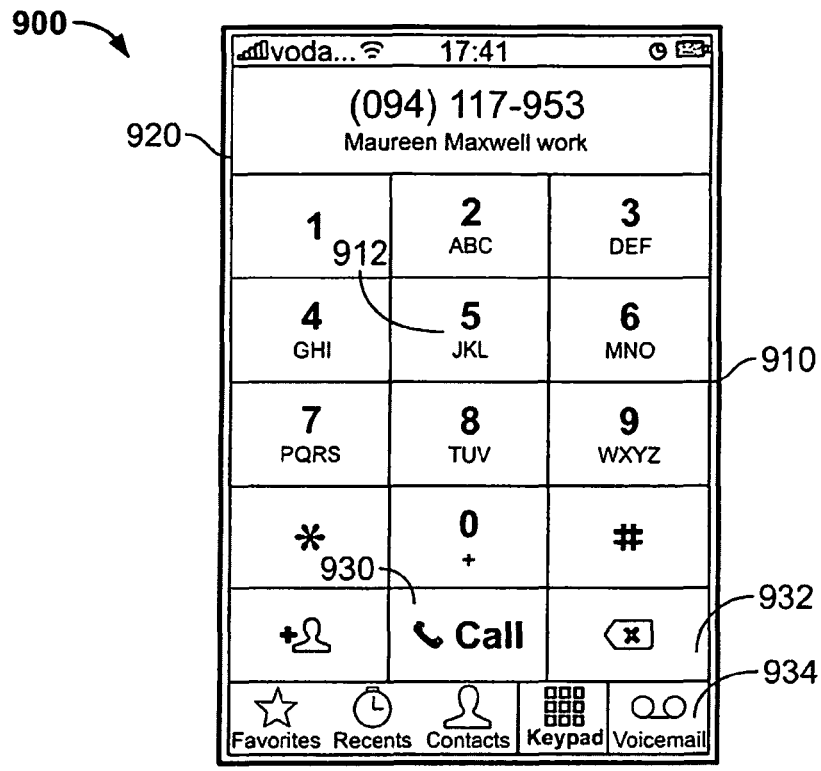
FIGS. 9A and 9B are illustrative display screens for providing inputs to an electronic device in accordance with one embodiment of the invention.
Figure 9B:
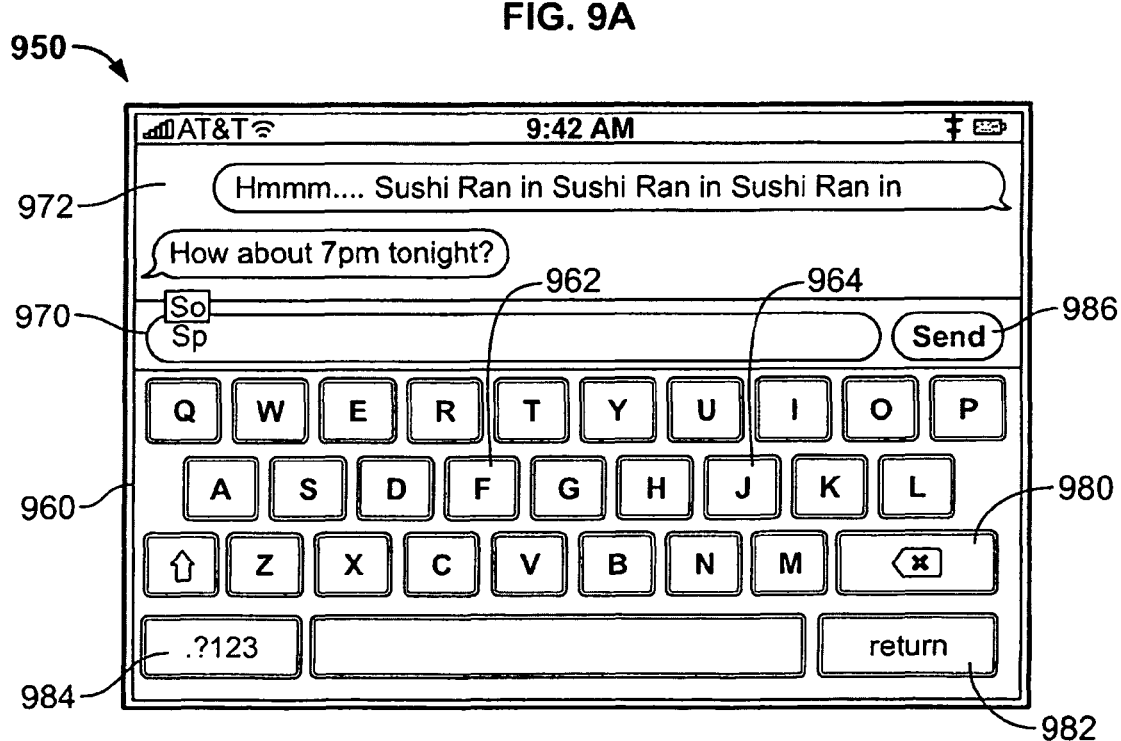

The electronic device may provide different types of feedback in different contexts based on the application accessed by the user, the current mode or status of that application, the position of the user's hand on the electronic device, the user's particular input, or any other suitable criteria. For example, the electronic device may provide tactile feedback for a user providing inputs using a keyboard or keypad. FIGS. 9A and 9B are illustrative display screens for providing inputs to an electronic device in accordance with one embodiment of the invention. Display screen 900 may include keypad 910 having selectable keys associated with numbers for providing number inputs to the electronic device. The numbers or characters associated with selected keys may be displayed in number portion 920. Similarly, display screen 950 may include keyboard 960 having selectable keys associated with characters for providing textual inputs to the electronic device. The characters associated with selected keys may be displayed in preview window 970, and subsequently transferred to communications window 972 (e.g., in response to receiving a user selection of send option 986 for sending the textual message provided by the user).

To provide guidance to a user of keypad 910 or keyboard 960 (e.g., for visually impaired users), the electronic device may provide tactile feedback as the user's finger is placed over particular keys. For example, the electronic device may be operative to provide tactile feedback (e.g., vibration) as the user's finger is placed over "5" key 912 (e.g., akin to a knob in the "5" key of a physical keypad). As another example, the electronic device may be operative to provide tactile feedback (e.g., vibration) as the user's finger is placed over "F" key 962 or "J" key 964 (e.g., akin to a knob in the "F" and "J" keys of a physical keyboard).

In some embodiments, the electronic device may further provide tactile feedback when the user approaches other keys of keypad 910 or keyboard 960. For example, the electronic device may provide tactile feedback when the user's finger is placed over special keys. Suitable special keys may include any key operative to perform an application function (e.g., other than providing text entry). For example, the electronic device may provide tactile feedback in response to a user selection of call option 930 or back option 932 of keypad 910. As another example, the electronic device may provide tactile feedback in response to a user selection of a key or option that would cause the electronic device to remove the display of keypad 910 (e.g., one of telephone application options 934). As still another example, the electronic device may provide tactile feedback in response to a user selection of back option 980, return option 982, character option 984, or send option 986 of keyboard 960.

The electronic device may provide the same or different tactile feedback for each of the keys of keypad 910 and keyboard 960. For example, the electronic device may provide different tactile feedback for each special key. In some embodiments, the tactile feedback for special keys performing similar functions in different keyboards may be the same to increase the user's familiarity with the electronic device (e.g., back option 932 and back option 980 may have the same tactile feedback, or call option 930 and send option 986 may have the same tactile feedback). As another example, the electronic device may provide different tactile feedback to differentiate "F" key 962 and "J" key 964. As still another example, the electronic device may provide simultaneous localized tactile feedback to several keys to identify a particular key over which the user places his finger (e.g., provide tactile feedback under a special key and the nearest of the "F" and "J" keys to indicate to the user the relative position of the special key on the keyboard).

In some embodiments, the electronic device may provide tactile feedback to the user in response to detecting the user's finger over preview window 970. For example, the electronic device may provide tactile feedback to indicate the placement of a cursor or marker in preview window 970. As another example, the electronic device may provide tactile feedback for each line of text, word, or character entered in preview window 970. By providing tactile feedback (e.g., the same or varying) for each line, word or character, the electronic device may provide sensitivity and guidance for the user to provide accurate text entry at a desired location in preview window 970.

The electronic device may provide tactile feedback to the user using any suitable approach. For example, the electronic device may provide tactile feedback when the user removes his finger from the particular key (e.g., to provide feedback that the key was selected). As another example, the electronic device may progressively modify the tactile feedback as the user approaches the key. For example, as the user moves a finger across keypad 910 towards "5" key 912, the electronic device may progressively increase (or decrease) the amplitude or frequency of the tactile feedback. If the user instead moves a finger away from "5" key 912, the electronic device may progressively decrease (or increase) the amplitude or frequency of the tactile feedback. When the tactile feedback is vibration, the user may then feel softer vibration as the user's finger approaches or is placed on the edge of a key, and stronger vibration as the user's finger nears the center of the key. In some embodiments, the electronic device may remove the tactile feedback (e.g., the vibration) when the user's finger is located at the very center of the displayed key (e.g., like the eye of a storm) to avoid numbing the user's finger.

Figure 10:
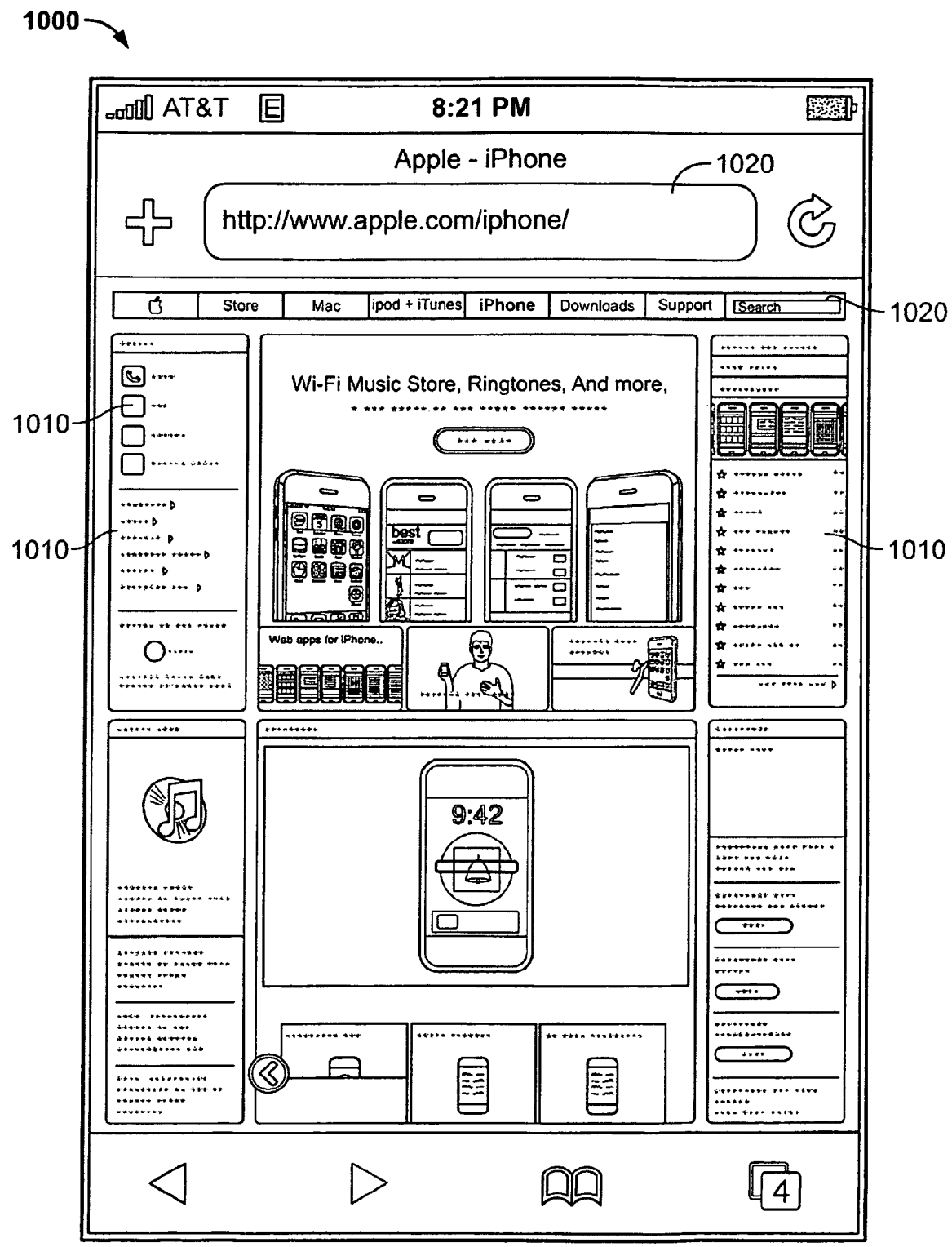
FIG. 10 is a schematic view of an illustrative display screen of a page in accordance with one embodiment of the invention.

In some embodiments, the electronic device may provide particular feedback based on the status or mode of an application used. For example, the electronic device may provide tactile feedback when the user selects a link or text input window of a display. As another example, the electronic device may be operative to provide tactile feedback as the user scrolls a page or a display. As still another example, the electronic device may provide tactile feedback as the user zooms the display. FIG. 10 is a schematic view of an illustrative display screen of a page in accordance with one embodiment of the invention. Display 1000 may be any suitable application screen with which the user may interact to control application features. For example, display 1000 may include a web browser page. Display 1000 may include several selectable options 1010, which may be operative to provide access to other displays, other applications, initialize or end communications operations, or any other suitable operation. In the example of display 1000, options 1010 may include hyperlinks or options from a menu (e.g., a drop-down menu).

In some embodiments, the electronic device may be operative to provide tactile feedback as the user passes over or selects an option 1010. For example, the electronic device may be operative to provide tactile feedback in response to receiving a user selection of a hyperlink. The electronic device may provide tactile feedback for some or all of selectable options 1010 of display 1000. For example, the electronic device may only provide feedback for more prominent options 1010 (e.g., options that take up a larger portion of the display, such as a button instead of text). As another example, the electronic device may provide feedback for options that cause information provided by the user to be sent to another device or server (e.g., a purchase option displayed after entering credit card information). As still another example, the selectable options of the application may include tags or flags (e.g., meta data) defined by the user or the programmer for identifying the particular selectable options 1010 for which to provide tactile feedback.

In some embodiments, the electronic device may provide tactile feedback in response to detecting the user's finger over text box 1020 or receiving a user selection of text box 1020 to demarcate the location of text box 1020 on the screen. Text box 1020 may include any suitable option or box in display 1000 in which the user may provide text. For example, text box 1020 may include search fields, internet web address fields (e.g., in a web browser), comments fields, username and password fields, shipping information fields, payment information fields, or any other suitable field in which the user may provide text. If the display includes several successive text boxes 1020 (e.g., successive fields for providing a shipping address), the electronic device may initially only provide tactile feedback for the first box, and then provide tactile feedback for each successive box in turn as the user provides text to the previous box. In response to receiving a user selection of a text box 1020, the electronic device may display a keyboard or keypad for providing text (e.g., keypad 910 of FIG. 9A or keyboard 960 of FIG. 9B).

Figure 11:
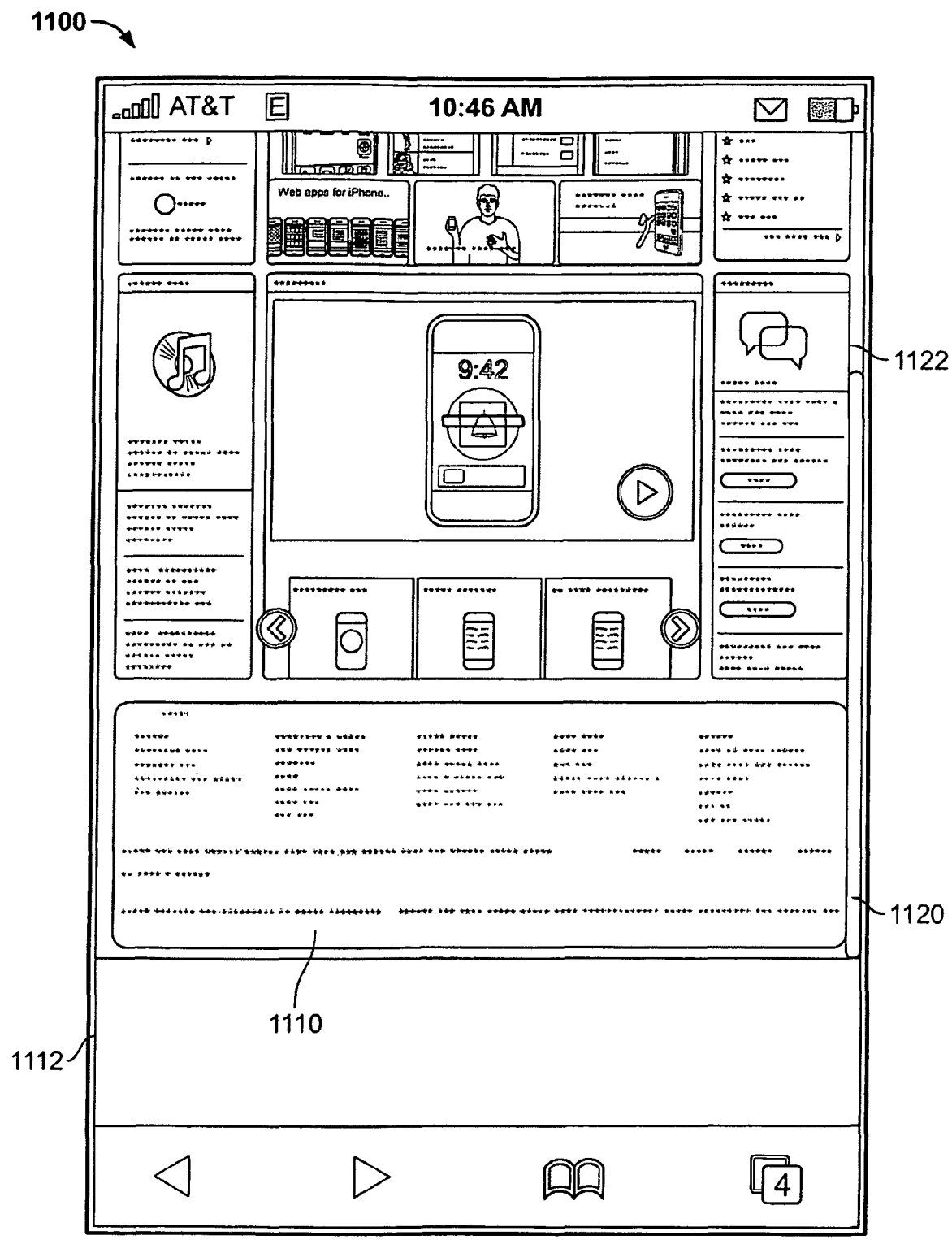
FIG. 11 is a schematic view of illustrative display 1000 of FIG. 10 when the display is scrolled in accordance with one embodiment of the invention.

In some embodiments, the electronic device may provide tactile feedback to assist the user in performing scrolling operations. For example, the electronic device may provide tactile feedback to mimic detents as the user scrolls through entries in a list. As another example, tactile feedback may be used to mimic a mechanical stop as the user reaches the beginning or the end of a scrollable display. FIG. 11 is a schematic view of illustrative display 1000 of FIG. 10 when the display is scrolled in accordance with one embodiment of the invention. Display 1100 may include some or all of selectable options 1010 and text boxes 1020 of display 1000. As the user scrolls down display 1000, the electronic device may display portions of the page provided by the application (e.g., portions of the web page) that were not initially displayed in display 1000. To indicate to the user that the end of the page has been reached, the electronic device may scroll the page beyond lower limit 1110 of the page and display background 1112. In some embodiments, the electronic device may display scroll bar 1120 to provide an indication of the amount of the page provided in display 1100 and the relative portion of the page that is displayed. For example, the user may compare scroll bar 1120 with scroll bar region 1122 to determine the relative amount of scroll bar region 1122 taken by scroll bar 1120, and to determine the position of scroll bar 1120 in scroll bar region 1122. The electronic device may provide any suitable tactile feedback as the user reaches limit 1110 of the page. For example, the electronic device may provide tactile feedback (e.g., in increasing intensity or frequency) as the user approaches limit 1110. As another example, the electronic device may provide tactile feedback (e.g., in increasing intensity or frequency) as the user moves beyond limit 1110 (e.g., the more background 1112 is displayed, the stronger the tactile feedback).

Figure 12:
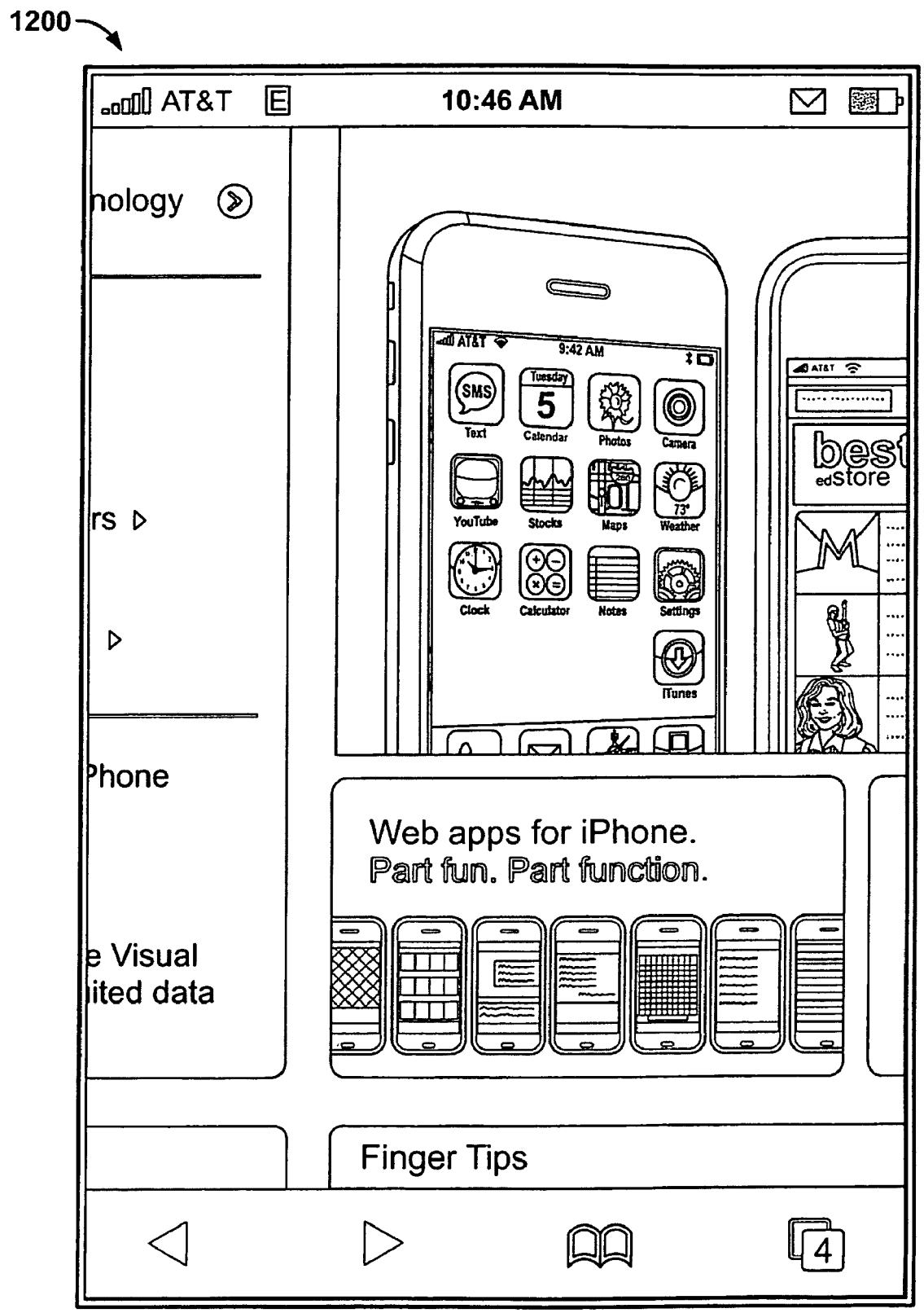
FIG. 12 is a schematic view of illustrative display 1000 of FIG. 10 when the display is zoomed in accordance with one embodiment of the invention.

In some embodiments, the electronic device may provide tactile feedback when the user zooms a display. FIG. 12 is a schematic view of illustrative display 1000 of FIG. 10 when the display is zoomed in accordance with one embodiment of the invention. Display 1200 may be a zoomed in display of the page in display 1000. For example, display 1200 may include a more detailed view of a particular aspect of display 1000 (e.g., a more detailed view of one or more images). The electronic device may provide any suitable tactile feedback as the user zooms the display. For example, the electronic device may provide tactile feedback (e.g., in increasing amounts) as the user approaches a zoom-in or zoom-out limit of the electronic device (e.g., the limit after which the electronic device can no longer render the display). As another example, the electronic device may provide tactile feedback to identify the particular amount of zoom used by the user (e.g., different tactile feedback for 50%, 75%, 100% and 200% zoom).

In some embodiments, the electronic device may provide tactile feedback based on the physical location of the electronic device. For example, the electronic device may provide tactile feedback based on the user's distance relative to a particular location. As another example, the electronic device may provide tactile feedback to guide the user along a particular path between two locations (e.g., provide tactile feedback when the user follows or leaves the particular path).

The electronic device may determine the current position of the electronic device using any suitable approach. In some embodiments, the electronic device may include a location module. Although the location module may be implemented in software, in some embodiments, the location module may also be implemented in hardware, firmware, or any combination of software, hardware, and firmware. For example, the location module may include an application process, thread, or subroutine configured to compute the position, orientation, movement, or location of the electronic device. The location of the electronic device may be derived from any suitable trilateration or triangulation technique, in which case the location module may include a Global Position System (GPS) receiver, RF triangulation detector or sensor, or any other location circuitry configured to determine the geographic or physical location of the electronic device. The location module may also include the associated applications to support the location circuitry. The location module may also include one or more sensors or circuitry for detecting the position, orientation, or movement of the electronic device. Such sensors and circuitry may include, for example, single-axis or multi-axis accelerometers, angular rate or inertial sensors (e.g., optical gyroscopes, vibrating gyroscopes, gas rate gyroscopes, or ring gyroscopes), magnetometers (e.g., scalar or vector magnetometers), and linear velocity sensors. For example, the processor may be configured to read data from one or more of the sensors or circuitry in the location module in order to determine the orientation of the electronic device and its velocity. The derivation of the location of a communications device is described in more detail in pending U.S. Patent Application Publication No. 2009/0170532, published Jul. 2, 2009, and entitled "Event-Based Modes For Electronic Devices", which is incorporated by reference herein in its entirety.

Figure 13:
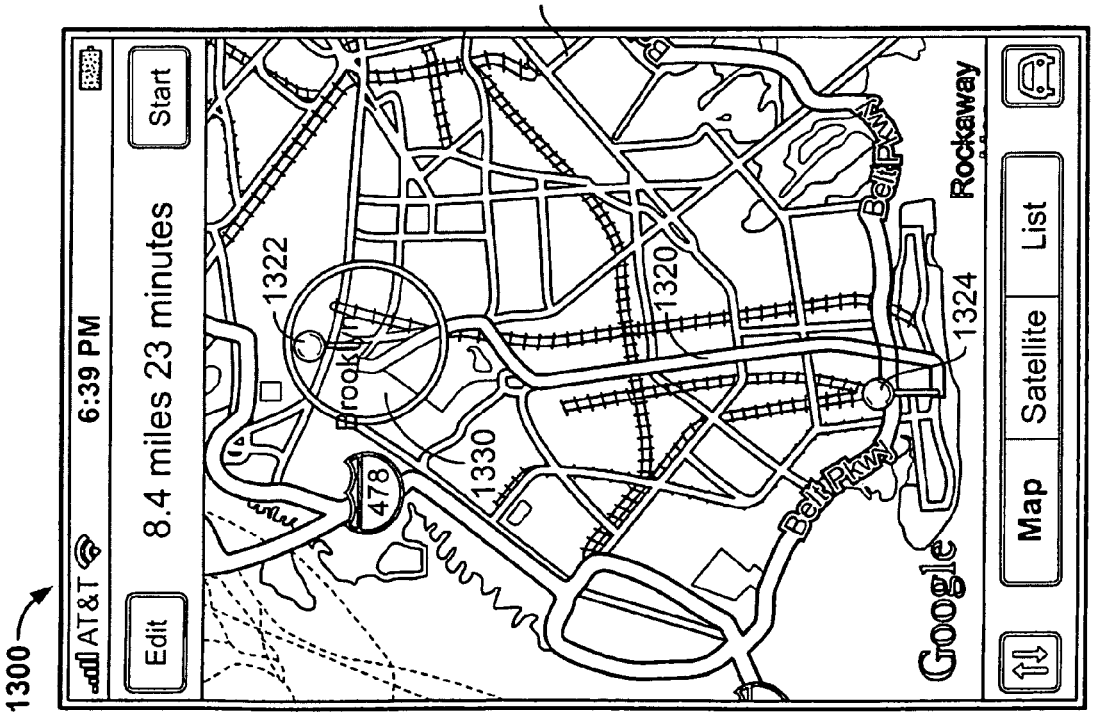
FIG. 13 is a schematic view of an illustrative display screen of a mapping application in accordance with one embodiment.

FIG. 13 is a schematic view of an illustrative display screen of a mapping application in accordance with one embodiment. Display 1300 may include map 1302 displayed by any suitable application. Map 1302 may include streets, roads, traffic information, topography, symbols, or any other suitable symbol, object or feature. In some embodiments, map 1302 may include a schematic view, a satellite view, or a combination of the displayed geographic area. The user may direct map 1302 to display any suitable information. For example, in response to a search for a particular store or address, the electronic device may direct the map to display a marker or indicator for the particular store or address identified as a result of the search. The user may also provide the electronic device with an initial location from which the map may identify a path for reaching the displayed marker or indicator representing the search result. In the example of FIG. 13, map 1302 may include initial pin 1322 (e.g., the user's current location) and ending pin 1324 (e.g., the location of a search result), and path 1320 connecting initial pin 1322 to ending pin 1324. Path 1320 may include any suitable path, including a straight line path, a path that avoids particular geographic obstacles (e.g., avoids bodies of water, mountains, or particular changes in altitude), or a path that follows roads.

In some embodiments, the user may direct the map to display the current location of the electronic device on the map. For example, the electronic device may display marker 1330 indicating the user's current position on the map. Marker 1330 may include any suitable type of marker, including for example a marker that identifies the uncertainty or variance of the user's position. For example, marker 1330 may include a circle or disc, where the radius of the circle or disc is selected based on the accuracy of the identified location (e.g., smaller circle for GPS tracking, but larger circle for cellular tower triangulation).

Figure 14:
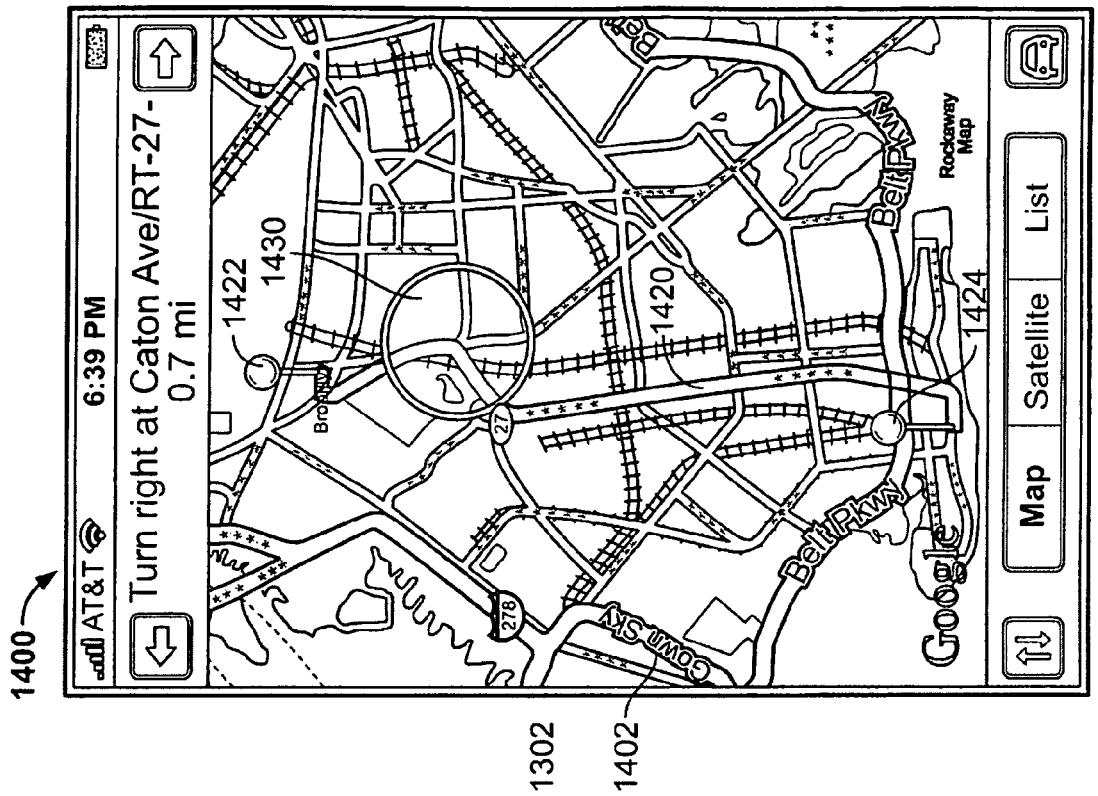
FIG. 14 is a schematic view of an illustrative display screen of a mapping application as a user follows a determined path in accordance with one embodiment of the invention.

FIG. 14 is a schematic view of an illustrative display screen of a mapping application as a user follows a determined path in accordance with one embodiment of the invention. Display 1400 may include map 1402, which may include some or all of the features of map 1302. In some embodiments, map 1402 may be zoomed with respect to map 1302. Map 1402 may include initial pin 1422 (which may be the same as pin 1322), ending pin 1424 (which may be the same as pin 1324), and path 1420 connecting pins 1422 and 1424 (which may be the same path as path 1320). As the user moves (with the electronic device), the position of marker 1430 may change in map 1402 to reflect the current position of the electronic device.

To guide the user to a particular destination (e.g., ending pin 1424), the electronic device may provide tactile feedback based on the user's location. In some embodiments, the electronic device may provide tactile feedback to guide the user along a particular path. For example, if path 1420 is displayed, the electronic device may provide tactile feedback when the user moves away from path 1420. The type of tactile feedback provided (e.g., the strength of the feedback) may be selected based on one or more of the distance from the path and the direction from the path of the electronic device (e.g., stronger feedback if the user is far from the recommended path, or leaves the path in a direction leading farther away from the destination). Alternatively, or in addition, the electronic device may provide tactile feedback when the user moves along path 1420 (e.g., increasing the level or type of feedback as the user approaches the destination). For example, the electronic device may provide heat-based feedback by which the temperature of the feedback increases as the user approaches the destination.

In some embodiments, the electronic device may provide tactile feedback based on a user's distance from one or more destinations (e.g., different search results). For example, the electronic device may provide different tactile feedback associated with each search result. As the user approaches a destination associated with a particular search result, the electronic device may provide the tactile feedback associated with the particular search result (e.g., vibrate with a particular frequency). The strength or amplitude of the feedback may be related to the distance from the search result (e.g., stronger particular tactile feedback as the user approaches the location of the particular search result).

The electronic device may be operative to provide tactile feedback in any other suitable context. In some embodiments, the user may define situations or contexts in which the electronic device may provide tactile feedback. For example, the electronic device may provide the user with the opportunity to tag or flag situations or contexts for which tactile feedback should be provided. The user may also be given the opportunity to select which particular tactile feedback to provide for each tagged situation (e.g., using a display such as display 600, FIG. 6).

Figure 15:
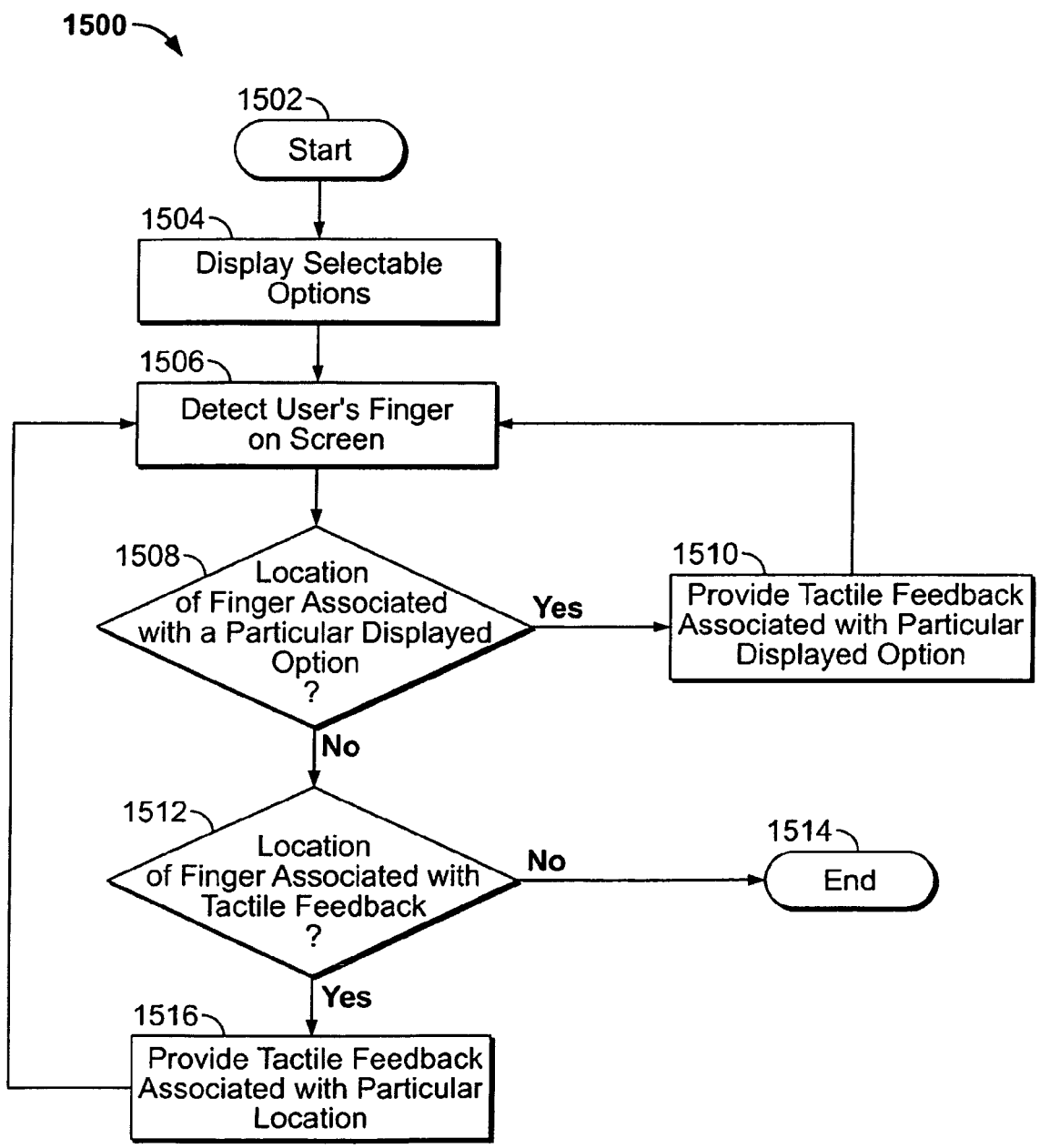
FIG. 15 is a flowchart of an illustrative process for providing tactile feedback in response to receiving a user input in accordance with one embodiment of the invention.

FIG. 15 is a flowchart of an illustrative process for providing tactile feedback in response to receiving a user input in accordance with one embodiment of the invention. Process 1500 may begin at step 1502. At step 1504, the electronic device may display selectable options. For example, the electronic device may display a plurality of selectable keys. As another example, the electronic device may display a menu with selectable items. As still another example, the electronic device may display hyperlinks or other selectable options available from a web page. At step 1506, the electronic device may detect a user's finger on the screen. For example, a touch screen of the electronic device may detect the user's finger on the display. In some embodiments, other approaches may be used to provide inputs to the electronic device.

At step 1508, the electronic device may determine whether the location of the finger is associated with a particular selectable option. For example, the electronic device may determine whether the user's finger is placed abutting a selectable option (e.g., on the edge of a displayed button). As another example, the electronic device may determine whether the user's finger is placed directly on an option or field (e.g., a text-entry field). If the electronic device determines that the location of the user's finger is associated with a particular option, process 1500 may move to step 1510. At step 1510, the electronic device may provide tactile feedback associated with the particular displayed option. For example, the electronic device may identify the characteristics of the tactile feedback associated with the particular option, and provide tactile feedback using the identified characteristics. If no tactile feedback is associated with the particular displayed option, process 1500 may skip step 1510 and move to the following step. Process 1500 may then return to step 1506 and detect the current position of the user's finger on the screen.

If, at step 1508, the electronic device instead determines that the location of the user's finger is not associated with a particular option, process 1500 may move to step 1512. At step 1512, the electronic device may determine whether the location of the finger is associated with tactile feedback. For example, the electronic device may determine whether the user's finger is located in a region adjacent a selectable option (e.g., a small distance away from a selectable option). As another example, the electronic device may determine whether the user's finger is located in a region associated with zooming or scrolling the display. If the electronic device determines that the location of the finger is not associated with tactile feedback, process 1500 may move to step 1514 and end.

If, at step 1512, the electronic device instead determines that the location of the finger is associated with tactile feedback, process 1500 may move to step 1516. At step 1516, the electronic device may provide tactile feedback associated with the particular location. For example, the electronic device may provide tactile feedback of increasing intensity to guide the user to a selectable option. As another example, the electronic device may provide tactile feedback indicating the amount the display was scrolled, or a limit to scrolling or zooming the display. Process 1500 may then return to step 1506 and detect the current position of the user's finger on the screen.

The above described embodiments of the present invention are presented for purposes of illustration and not of limitation, and the present invention is limited only by the claims which follow.

What is claimed is:

1. A method for providing tactile feedback as guidance for a user of an electronic device, the method comprising:
   displaying at least one selectable option on a display of the electronic device;
   detecting a user input on the display;
   providing tactile feedback at a first level to guide the user to the at least one selectable option in response to detecting the input; and
   increasing the tactile feedback to a second level as the input moves towards the at least one selectable option.

2. The method of claim 1, wherein the at least one selectable option comprises a key of one of a keyboard and a keypad.

3. The method of claim 1, wherein:
   displaying further comprises displaying a plurality of selectable options;
   detecting further comprises detecting the input moving towards a particular one of the plurality of selectable options; and
   providing further comprises providing tactile feedback associated with the particular one of the plurality of selectable options, wherein different tactile feedback is associated with at least two of the plurality of selectable options.

4. The method of claim 3, wherein:
   displaying a plurality of selectable options further comprises displaying at least one option for entering data and at least one option for removing entered data; and
   the tactile feedback associated with the at least one option for entering data is different than the tactile feedback associated with the at least one option for removing entered data.

5. The method of claim 1, wherein providing tactile feedback comprises providing at least one of vibration feedback, heat feedback, and electrical feedback.

6. A method for providing tactile feedback to a user of an electronic device, comprising:
   detecting a portion of a user's hand on a first location of the display at a first distance from a selectable option;
   providing a first tactile feedback to the user in response to detecting the portion of the user's hand on the first location;
   detecting a portion of a user's hand on a second location of the display at a second distance from the selectable option; and
   providing a second tactile feedback to the user in response to detecting the portion of the user's hand on the second location, the second tactile feedback being different from that of the first tactile feedback.

7. The method of claim 6 further comprising:
   detecting movement of the portion of the user's hand from the first location to the second location on the display; and
   providing tactile feedback as the portion of the user's hand moves on the display.

8. The method of claim 7 further comprising:
determining that the detected movement of the portion of the user's hand from the first location to the second location on the display comprises an input to at least one of scroll and zoom the display; and
in response to determining, providing tactile feedback to the user.

9. The method of claim 8, further comprising:
identifying at least one of a scrolling limit and a zooming limit of the display associated with the determined input; and
in response to identifying, providing tactile feedback to the user.

10. The method of claim 6, wherein:
tactile feedback is defined by at least one of a frequency, an amplitude, a change in frequency, a change in amplitude, a duration, and a period; and
at least one of a frequency, an amplitude, a change in frequency, a change in amplitude, a duration, and period of the first tactile feedback is different than that of the second tactile feedback.

11. A method for providing tactile feedback using an electronic device, the method comprising:
displaying a plurality of selectable options;
detecting an input adjacent to a particular one of the plurality of selectable options;
identifying particular tactile feedback associated with the particular one of the plurality of selectable options in response to detecting, wherein one of at least two different tactile feedback is associated with each of the plurality of selectable options; and
providing the identified tactile feedback at varying intensity based on a distance of the detected input from the particular one of the plurality of selected options.

12. The method of claim 11, wherein:
displaying further comprises displaying different types of options; and
a different tactile feedback is associated with each of the plurality of different types of options.

13. The method of claim 11, wherein:
displaying further comprises displaying a plurality of options in a plurality of different areas of the display; and
a different tactile feedback is associated with each of the plurality of different areas of the display.

14. The method of claim 11, further comprising:
detecting the input directly over the particular selectable option; and
ceasing the identified tactile feedback in response to detecting the input directly over the particular selectable option.

15. The method of claim 11, further comprising:
receiving a user selection of the particular selectable option;
in response to receiving, identifying particular tactile feedback associated with the selection of the particular selectable option; and
providing the identified tactile feedback.

16. A method for guiding a user providing textual input to an electronic device, the method comprising:
displaying at least one field for receiving text;
receiving a user input in a vicinity of the at least one field;
determining a distance between the input and the at least one field; and
providing a first tactile feedback of varying intensity based on the determined distance in response to receiving.

17. The method of claim 16, further comprising:
displaying a plurality of keys associated with characters to enter in the at least one field in response to receiving;
detecting an input over a particular key of the plurality of keys; and
providing a second tactile feedback in response to detecting.

18. The method of claim 17, wherein displaying a plurality of keys further comprises displaying at least one of a keyboard and a keypad.

19. The method of claim 17, wherein the particular key comprises a key associated with at least one of a "F" character, a "J" character, and a "5" character.

20. The method of claim 17, wherein the particular key comprises a key associated with at least one of a delete instruction and an enter instruction.

21. The method of claim 17, wherein the first tactile feedback and the second tactile feedback are different.

22. The method of claim 16, further comprising:
displaying a cursor indicating a current text entry position in the at least one field;
determining that the input is located in the proximity of the cursor; and
providing a second tactile feedback in response to determining.

23. The method of claim 22, further comprising:
displaying text in the at least one field, wherein the displayed text comprises at least a line, a word and a character;
detecting an input over at least one of a displayed line, word and character; and
providing tactile feedback in response to detecting.

24. A device, comprising:
a capacitive touch display;
a tactile feedback component; and
processing circuitry operative to activate the tactile feedback component in response to a capacitance detection event on the capacitive touch display, wherein:
the tactile feedback component provides tactile feedback at a first level in response to the capacitive touch display detecting an input at a first distance from a displayed object; and
the tactile feedback component provides tactile feedback at a second level different from the first level in response to the capacitive touch display detecting an input at a second distance from the displayed object.

25. The device of claim 24, wherein the capacitive touch display comprises a multi-touch capacitive detection system.

26. The device of claim 24, wherein the capacitance detection event is associated with an input moving across the capacitive touch display.

27. The device of claim 24, wherein the capacitive touch display is operative to:
detect a user's finger on the capacitive touch display; and
generate a capacitive detection event in response to detecting.

28. The device of claim 24, wherein the processing circuitry is further operative to:
identify objects displayed on the capacitive touch display;
determine the spatial relation between the identified objects and the capacitance detection event; and
activate the tactile feedback component in response to determining.

* * * * *